US012638996B2

(12) United States Patent
Lee et al.

(10) Patent No.: US 12,638,996 B2
(45) Date of Patent: May 26, 2026

(54) OPERATING METHOD OF STORAGE CONTROLLER MANAGING SYSTEM MEMORY BLOCKS AND STORAGE DEVICE INCLUDING THE SAME

(71) Applicant: SK hynix Inc., Gyeonggi-do (KR)

(72) Inventors: Jae Il Lee, Gyeonggi-do (KR); Hye Rim Yoo, Gyeonggi-do (KR); Byung Min Ha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 18/498,032

(22) Filed: Oct. 31, 2023

(65) Prior Publication Data

US 2024/0377976 A1 Nov. 14, 2024

(30) Foreign Application Priority Data

May 10, 2023 (KR) ........................ 10-2023-0060448

(51) Int. Cl.
*G06F 3/06* (2006.01)

(52) U.S. Cl.
CPC ............ *G06F 3/064* (2013.01); *G06F 3/0616* (2013.01); *G06F 3/0619* (2013.01); *G06F 3/0631* (2013.01); *G06F 3/0652* (2013.01); *G06F 3/0679* (2013.01)

(58) Field of Classification Search
CPC ...... G06F 3/064; G06F 3/0616; G06F 3/0619; G06F 3/0631; G06F 3/0652; G06F 3/0679
USPC ........................................................ 711/154
See application file for complete search history.

(56) References Cited

U.S. PATENT DOCUMENTS

| | | | | |
|---|---|---|---|---|
| 2013/0346676 A1* | 12/2013 | Kim | .................... | G06F 12/0246 |
| | | | | 711/103 |
| 2018/0365143 A1* | 12/2018 | Hung | .................... | G06F 3/0679 |
| 2019/0179548 A1* | 6/2019 | Lee | ......................... | G06F 3/061 |
| 2019/0187934 A1 | 6/2019 | Sicola et al. | | |
| 2020/0183588 A1* | 6/2020 | Lee | ......................... | G06F 3/0649 |
| 2020/0257621 A1* | 8/2020 | Pletka | ................ | G06F 12/0253 |
| 2021/0191854 A1* | 6/2021 | Yang | .................... | G06F 13/1673 |
| 2021/0294739 A1* | 9/2021 | Oh | ........................... | G06F 9/546 |
| 2021/0303176 A1* | 9/2021 | Shin | .................... | G06F 3/0647 |
| 2021/0365202 A1* | 11/2021 | Shin | .................... | G06F 3/0679 |

(Continued)

FOREIGN PATENT DOCUMENTS

KR 10-2014-0000751 A 1/2014

*Primary Examiner* — Reginald G Bragdon
*Assistant Examiner* — Aaron D Ho
(74) *Attorney, Agent, or Firm* — IP & T GROUP LLP

(57) ABSTRACT

According to an embodiment of the present technology, a storage device includes a non-volatile memory device including a first memory block area and a second memory block area, and a storage controller configured to control the non-volatile memory device, determine a target erase count based on a generated assignment request among a first assignment request and a second assignment request, and assign a target memory block corresponding to the target erase count, as a memory block corresponding to the generated assignment request, to a shared block pool. The first assignment request corresponds to a memory block of a first type in the first memory block area, the second assignment request corresponds to a memory block of a second type in the first memory block area, and the target memory block is included in the first memory block area.

20 Claims, 10 Drawing Sheets

12

(56)                    References Cited

U.S. PATENT DOCUMENTS

| | | | | |
|---|---|---|---|---|
| 2021/0391029 A1* | 12/2021 | Liu | .......................... | G11C 29/76 |
| 2021/0397558 A1* | 12/2021 | Cho | .......................... | G06F 3/064 |
| 2022/0057938 A1* | 2/2022 | Park | ...................... | G06F 3/0644 |
| 2022/0066925 A1* | 3/2022 | Park | ..................... | G06F 12/0891 |
| 2022/0093184 A1* | 3/2022 | Kim | ..................... | H01L 25/0657 |
| 2022/0121375 A1* | 4/2022 | Kim | ...................... | G06F 3/0616 |
| 2022/0171707 A1* | 6/2022 | Lee | .......................... | G06F 12/10 |

* cited by examiner

OPERATING METHOD OF STORAGE CONTROLLER MANAGING SYSTEM MEMORY BLOCKS AND STORAGE DEVICE INCLUDING THE SAME

CROSS-REFERENCE TO RELATED APPLICATION

The present application claims priority under 35 U.S.C. § 119 (a) to Korean patent application number 10-2023-0060448 filed on May 10, 2023, the entire disclosure of which is incorporated by reference herein.

BACKGROUND

1. Field of Invention

Embodiments of the present disclosure relate to a storage device, and more particularly, to an operating method of a storage controller managing system memory blocks and a storage device including the same.

2. Description of Related Art

A storage device is capable of storing data according to a request from a host device such as a computer or a smart-phone. A storage device may include a memory device storing data and a storage controller controlling the memory device. The memory device may be classified into a volatile memory device and a non-volatile memory device.

The non-volatile memory device may include system memory blocks storing system data required to drive the storage device.

SUMMARY

An embodiment of the present disclosure provides a storage controller capable of integrating and managing system memory blocks.

According to an embodiment of the present disclosure, a storage device includes a non-volatile memory device including a first memory block area and a second memory block area, and a storage controller configured to control the non-volatile memory device, determine a target erase count based on a generated assignment request among a first assignment request and a second assignment request, and assign a target memory block corresponding to the target erase count, as a memory block corresponding to the generated assignment request, to a shared block pool. The first assignment request corresponds to a memory block of a first type in the first memory block area, the second assignment request corresponds to a memory block of a second type in the first memory block area, and the target memory block is included in the first memory block area.

According to an embodiment of the present disclosure, an operating method of a storage controller communicating with a non-volatile memory device including a first memory block area and a second memory block area includes generating at least one of a first assignment request and a second assignment request, determining a target erase count based on a generated assignment request, and assigning a target memory block corresponding to the target erase count, as a memory block corresponding to the generated assignment request, to a shared block pool. The first assignment request corresponds to a memory block of a first type in the first memory block area, the second assignment request corresponds to a memory block of a second type in the first memory block area, and the target memory block is included in the first memory block area.

The present technology includes a storage controller capable of integrating and managing system memory blocks. According to the present technology, the number of required system memory blocks may be reduced and the system memory blocks may be efficiently used, thereby improving performance of a storage device.

BRIEF DESCRIPTION OF THE DRAWINGS

FIG. 5 is a diagram illustrating a method of assigning system memory blocks according to an embodiment of the present disclosure.

FIG. 9 is a diagram illustrating an operation method of a storage device according to an embodiment of the present disclosure.

DETAILED DESCRIPTION

Figure 1:
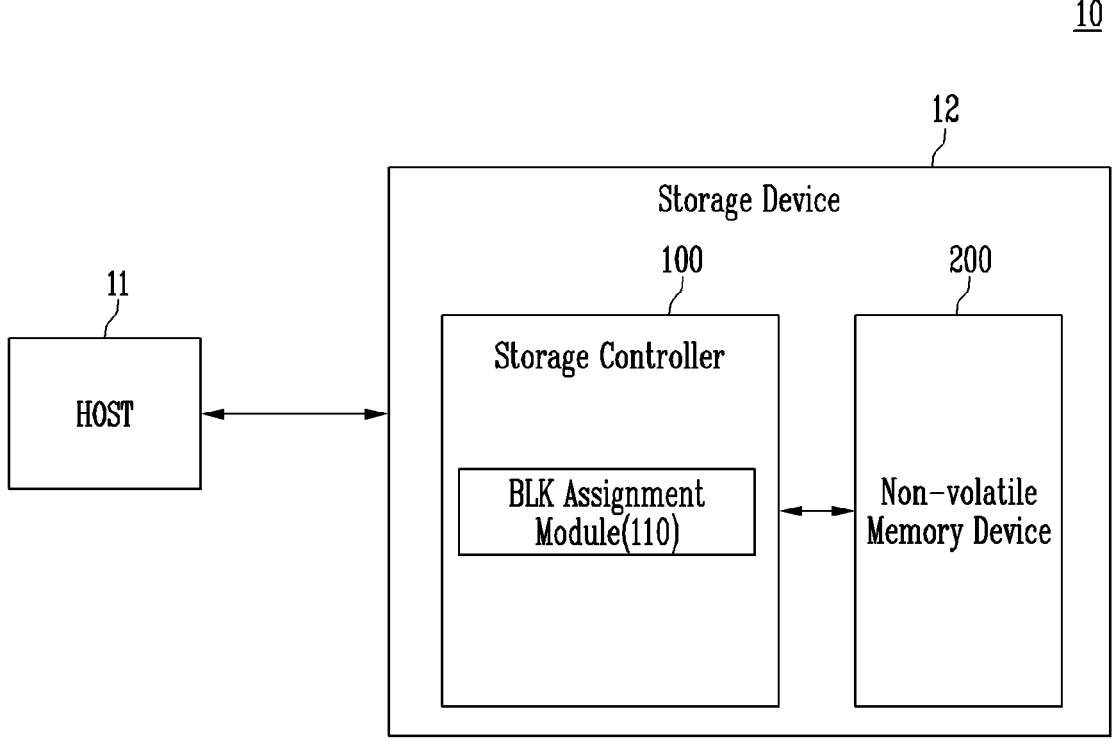
FIG. 1 is a block diagram illustrating a storage system according to an embodiment of the present disclosure.

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

In addition, terms such as "unit" and "module" used below, or functional blocks shown in the drawings, may be implemented in a form of a software configuration, a hardware configuration, or a combination thereof. In order to clearly describe the technical spirit of the present disclosure, a detailed description of overlapping components is omitted.

FIG. 1 is a block diagram illustrating a storage system 10 according to an embodiment of the present disclosure.

Referring to FIG. 1, the storage system 10 may include a host 11 and a storage device 12. In some embodiments, the storage system 10 may be a computing system configured to process various pieces of information, such as a personal computer (PC), a notebook, a laptop, a server, a workstation, a tablet PC, a smart phone, a digital camera, or a black box.

The host 11 may control overall operations of the storage system 10. For example, the host 11 may store data in the storage device 12 or read data stored in the storage device 12. For example, the host 11 may provide write data to the storage device 12 or request read data stored in the storage device 12.

The storage device 12 may include a storage controller 100 and a non-volatile memory device 200. The non-volatile memory device 200 may store data. The storage controller 100 may store data in the non-volatile memory device 200 or read data stored in the non-volatile memory device 200. The non-volatile memory device 200 may operate under control of the storage controller 100. For example, the storage controller 100 may store data in the non-volatile memory device 200 or read data stored in the non-volatile memory device 200 based on a command CMD indicating an operation and an address ADD indicating a position of data.

In some embodiments, the non-volatile memory device 200 may be a NAND flash memory, but the scope of the present disclosure is not limited thereto, and the non-volatile memory device 200 may be one of various storage devices capable of maintaining stored data even though power supply is cut off, such as a phase-change random access memory (PRAM), a magnetic random access memory (MRAM), a resistive random access memory (RRAM), or a ferroelectric random access memory (FRAM).

The non-volatile memory device 200 may include a plurality of memory blocks in a first memory block area and a plurality of memory blocks in a second memory block area. A memory element or a memory cell included in the first memory block area has less capacity of storing therein a number of data bits than a memory element or a memory cell included in the second memory block area. The first memory block area may be an area including data required to drive the storage device 12. The second memory block area may be an area including data other than the data required to drive the storage device 12.

For example, each of the plurality of memory blocks in the first memory block area may be implemented as a single level cell (SLC) in which one cell stores one bit. Each of the plurality of memory blocks in the second memory block area may be implemented as one of cells storing several bits such as a multi-level cell (MLC) in which one cell stores two bits, a triple-level cell (TLC) in which one cell stores three bits, and a quadruple level cell (QLC) in which one cell stores four bits.

In some embodiments, a number of data bits to be stored in memory elements or memory cells in the first and second memory block areas is plural.

The storage controller 100 may control the non-volatile memory device so that a memory element or a memory cell included in the first memory block area has less capacity of storing therein a number of data bits than a memory element or a memory cell included in the second memory block area.

For example, the storage controller 100 may control the non-volatile memory device 200 in which the memory element or the memory cell in the first and second memory block areas can store therein three (3) or greater data bits, to set the memory element in the first memory block area to an SLC memory element and the memory element in the second memory block area to an MLC memory element.

The first memory block area may include system memory blocks. The first memory block area may refer to system memory blocks of the non-volatile memory device 200. For example, each of the system memory blocks may be an SLC memory block. Each of the system memory blocks may store data required to drive the storage device 12. The system memory blocks may include memory blocks of a first type, a second type and a third type for different purposes or operations.

For example, the memory block of the first type may be a meta block. The meta block may store mapping data. The mapping data may include a table storing a mapping between a logical address designated by the host 11 and a physical address where data is stored in the storage device 12. The memory block of the second type may be a power loss protection (PLP) block. When sudden power-off occurs during a write operation of the storage device 12, the PLP block may store data written before power-off. The memory block of the third type may be a static SLC block. The static SLC block may be a block temporarily storing data during a write operation to improve performance of the write operation of the storage device 12.

Although the system memory blocks have been described as including the memory blocks of the first to third types in the present disclosure, the present disclosure is not limited thereto, and the system memory blocks may further include a root block storing root data required for updating firmware of the storage device 12.

The storage controller 100 may include a block assignment module 110. The block assignment module 110 may integrate and manage the system memory blocks of the non-volatile memory device 200. The block assignment module 110 may perform a block assignment operation on the first memory block area regardless of types of each of the system memory blocks. A more detailed description of this is described later along with FIG. 6.

Figure 2:
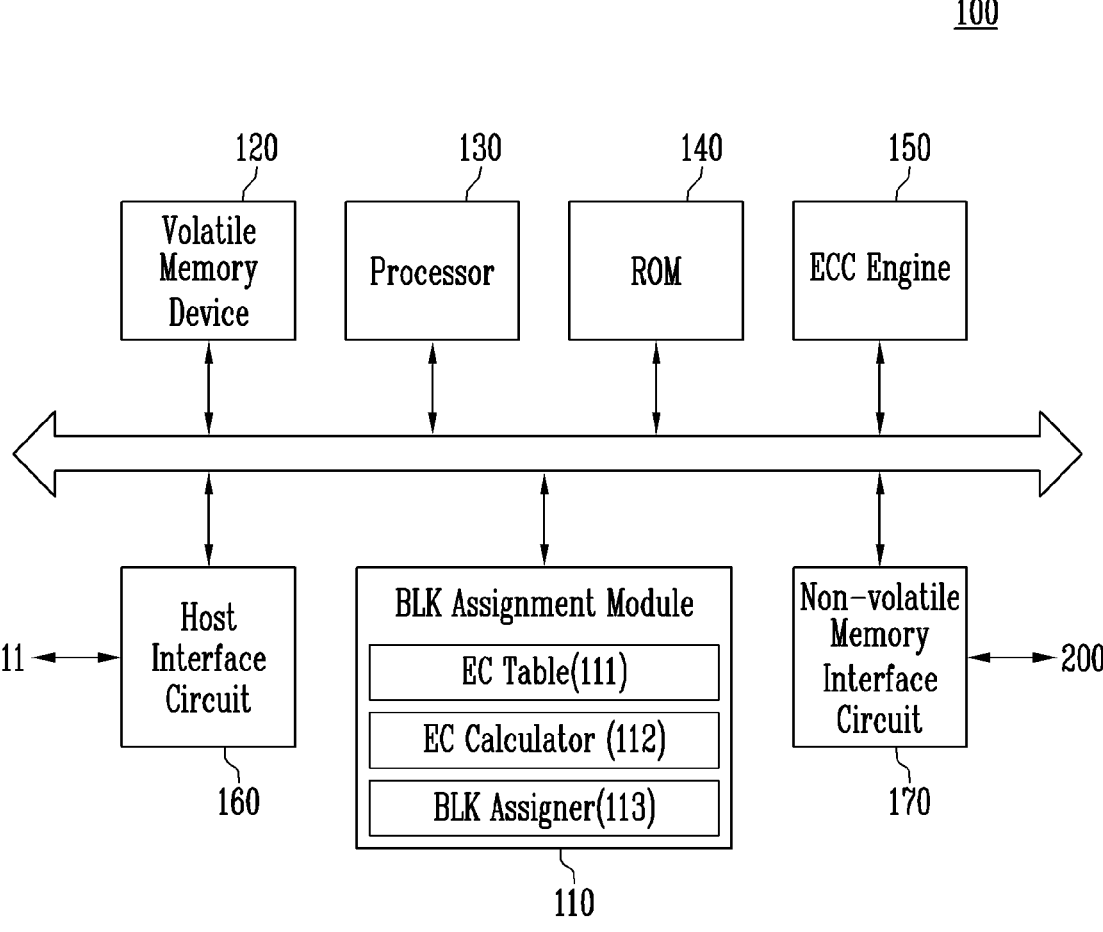
FIG. 2 is a detailed block diagram of a storage controller of FIG. 1 according to an embodiment of the present disclosure.

FIG. 2 is a detailed block diagram of the storage controller of FIG. 1 according to an embodiment of the present disclosure.

Referring to FIGS. 1 and 2, the storage controller 100 may communicate with the host 11 and the non-volatile memory device 200. The storage controller 100 may include a block (BLK) assignment module 110, a volatile memory device 120, a processor 130, a read only memory (ROM) 140, an error correction code (ECC) engine 150, a host interface circuit 160, and a non-volatile memory interface circuit 170.

The block assignment module 110 may include an erase count (EC) table 111, an erase count (EC) calculator 112, and a block (BLK) assigner 113. In some embodiments, the block assignment module 110 may be implemented in firmware. For example, the non-volatile memory device 200 may store commands corresponding to the block assignment module 110. The processor 130 may load commands of the non-volatile memory device 200 into the volatile memory device 120. The processor 130 may operate the block assignment module 110 by executing the loaded commands.

The EC table 111 may store erase counts for each of the plurality of memory blocks of the non-volatile memory device 200. The processor 130 may load the erase counts stored in the non-volatile memory device 200 into the volatile memory device 120. In some embodiments, the EC table 111 may be stored in the volatile memory device 120.

The EC calculator 112 may output a minimum erase count or a maximum erase count among the erase counts stored in the EC table 111 to the block assigner 113, based on a received assignment request among first to third assignment requests. The minimum erase count may have the smallest value among the erase counts. The maximum erase count may have the largest value among the erase counts.

The first assignment request may indicate assignment of a new memory block in the first memory block area, as the memory block of the first type, to a shared block pool. The memory block of the first type may be the meta block. The second assignment request may indicate assignment of a new memory block in the first memory block area, as the memory block of the second type, to the shared block pool. The memory block of the second type may be the PLP block. The third assignment request may indicate assignment of a new memory block in the first memory block area, as the memory block of the third type, to the shared block pool. The memory block of the third type may be the static SLC block.

When receiving the first assignment request, the EC calculator 112 may output the minimum erase count. When receiving the second assignment request, the EC calculator 112 may output the maximum erase count. When receiving the third assignment request, the EC calculator 112 may output the minimum erase count.

The block assigner 113 may assign a memory block corresponding to the received erase count as a memory block of a type corresponding to the received assignment request. For example, the block assigner 113 may assign a first memory block corresponding to the minimum erase count as the memory block of the first type corresponding to the first assignment request. The block assigner 113 may assign a second memory block corresponding to the maximum erase count as the memory block of the second type corresponding to the second assignment request. The block assigner 113 may assign a third memory block corresponding to the maximum erase count as the memory block of the third type corresponding to the third assignment request. The first to third memory blocks may be memory blocks of the first area.

The volatile memory device 120 may be used as a main memory, a cache memory, or an operation memory of the storage controller 100. For example, the volatile memory device 120 may be implemented as a static random access memory (SRAM), a dynamic random access memory (DRAM), or the like.

The processor 130 may control overall operations of the storage controller 100. The ROM 140 may be used as a read-only memory storing information necessary for an operation of the storage controller 100. The ECC engine 150 may detect and correct an error of data read from the non-volatile memory device 200. For example, the ECC engine 150 may have a certain level of error correction capability. The ECC engine 150 may process data having an error level (for example, the number of flipped bits) exceeding the error correction capability as uncorrectable data.

The storage controller 100 may communicate with the host 11 through the host interface circuit 160. In some embodiments, the host interface circuit 160 may be implemented based on least one of various interfaces such as a serial ATA (SATA), a peripheral component interconnect express (PCIe), a serial attached SCSI (SAS) interface, an embedded multi-media card (eMMC) interface, and a universal flash storage (UFS).

The storage controller 100 may communicate with the non-volatile memory device 200 through the non-volatile memory interface circuit 170. In some embodiments, the non-volatile memory interface circuit 170 may be implemented based on a NAND flash interface such as toggle and open NAND flash interface (ONFI).

Figure 3:
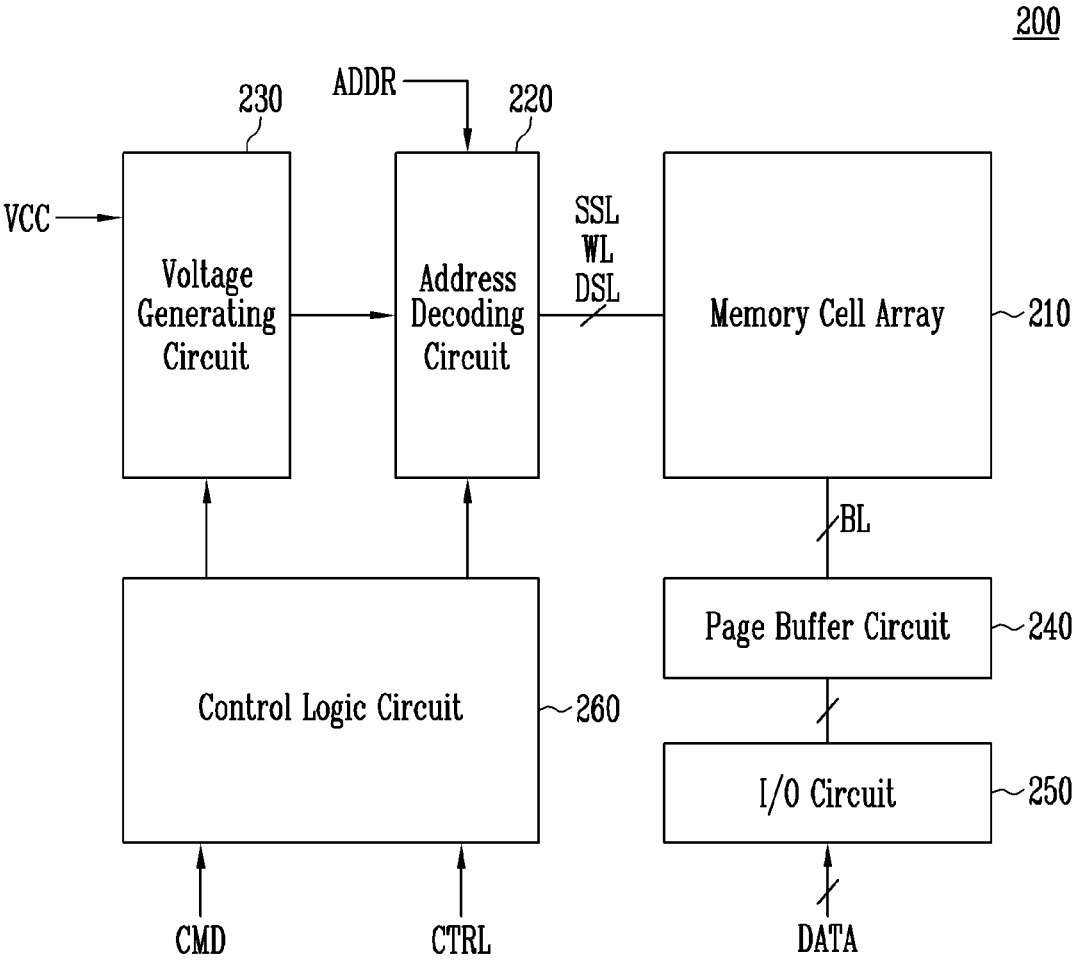
FIG. 3 is a detailed block diagram of a non-volatile memory device of FIG. 1 according to an embodiment of the present disclosure.

FIG. 3 is a detailed block diagram of the non-volatile memory device of FIG. 1 according to an embodiment of the present disclosure.

In some embodiments, the non-volatile memory device 200 may be a non-volatile memory device based on a NAND flash memory. However, the scope of the present disclosure is not limited thereto, and the non-volatile memory device 200 may be one of various types of memory devices such as a DRAM, an SRAM, a PRAM, an MRAM, an RRAM, and an FRAM.

Referring to FIG. 3, the non-volatile memory device 200 may include a memory cell array 210, an address decoding circuit 220, a voltage generating circuit 230, a page buffer circuit 240, an input/output (I/O) circuit 250, and a control logic circuit 260.

The memory cell array 210 may include a plurality of memory blocks. The plurality of memory blocks may be divided into a first memory block area and a second memory block area. Each of the plurality of memory blocks may include a plurality of cell strings. Each of the plurality of cell strings may be connected to the address decoding circuit 220 through row lines and connected to the page buffer circuit 240 through bit lines BL. The row lines may include drain select lines DSL, word lines WL, and source select lines SSL.

Each of the plurality of cell strings may include a plurality of memory cells. The plurality of memory cells may correspond to each of a plurality of cell transistors connected in series between the bit lines BL and select lines. The plurality of cell transistors may be connected to the drain select lines, the word lines, and the source select lines.

In an embodiment, the address decoding circuit 220, the voltage generating circuit 230, the page buffer circuit 240, and the input/output circuit 250 may be collectively referred to as a peripheral circuit. The peripheral circuit may drive the memory cell array 210 under control of the control logic circuit 260. The peripheral circuit may drive the memory cell array 210 to perform a program operation, a read operation, and an erase operation.

The address decoding circuit 220 may be connected to the memory cell array 210 through the row lines. The address decoding circuit 220 may receive an address ADDR from the control logic circuit 260. The address decoding circuit 220 may decode a block address of the received address ADDR. The address decoding circuit 220 may select at least one memory block from among the plurality of memory blocks according to the decoded block address.

The address decoding circuit 220 may decode a row address of the received address ADDR. The address decoding circuit 220 may select at least one word line among word lines of the selected memory block according to the decoded row address. In an embodiment, the address decoding circuit 220 may decode a column address of the received address ADDR. The address decoding circuit 220 may connect the input/output circuit 250 and the memory cell array 210 according to the decoded column address.

The voltage generating circuit 230 may generate various voltages necessary for the non-volatile memory device 200 to operate. For example, the voltage generating circuit 230 may generate various voltages such as a plurality of program voltages, a plurality of pass voltages, a plurality of verify voltages, a plurality of select read voltages, a plurality of non-select read voltages, a plurality of erase voltages, and a plurality of erase verify voltages, based on a power voltage VCC.

The page buffer circuit 240 may be connected to the memory cell array 210 through the bit lines BL. The page buffer circuit 240 may read data stored in the memory cell array 210 and temporarily store the read data by sensing a voltage change of the bit lines BL. The page buffer circuit 240 may receive data from the input/output circuit 250 and store the data in the memory cell array 210 by controlling the bit lines BL based on the received data.

The input/output circuit 250 may exchange data DATA with an external device (for example, a storage controller). For example, the input/output circuit 250 may receive the data DATA from the external device and transfer the received data DATA to the page buffer circuit 240. The input/output circuit 250 may receive the data DATA from the page buffer circuit 240 and transfer the received data to the external device.

The control logic circuit 260 may control overall operations of the non-volatile memory device 200. For example, the control logic circuit 260 may receive the command CMD and the address ADDR from an external device (for example, a memory controller), and generate control signals in response to the command CMD and the address ADDR to control the peripheral circuits.

Figure 4:
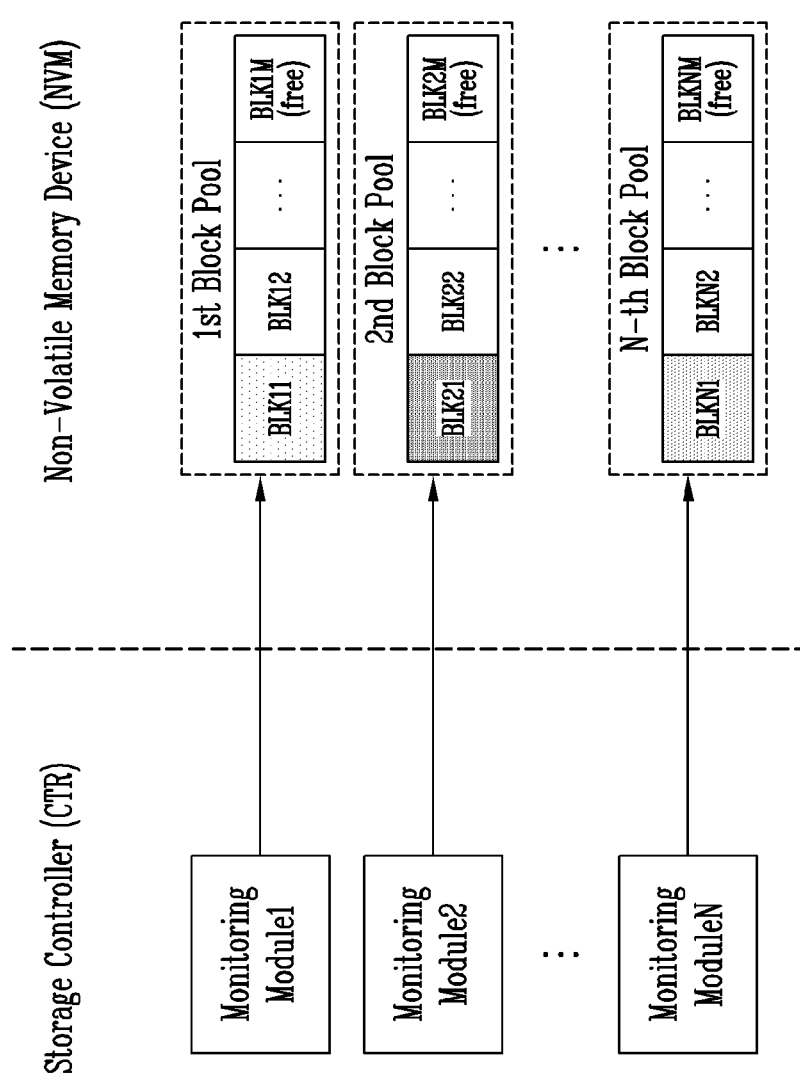
FIG. 4 is a diagram illustrating a method of assigning system memory blocks.

FIG. 4 is a diagram illustrating a method of assigning the system memory blocks.

Referring to FIG. 4, an operation in which first to N-th monitoring modules assign a memory block to first to N-th block pools, respectively, is described. The first to N-th block pools may correspond to first to N-th types, respectively. For example, memory blocks of the first block pool may be assigned as memory blocks of the first type. Memory blocks of the second block pool may be assigned as memory blocks of the second type. N is a natural number greater than 1.

The first monitoring module may assign one of first to M-th memory blocks BLK11 to BLK1M of the first block pool as the memory block of the first type. For example, the first monitoring module may assign the first memory block BLK11 as the memory block of the first type. M is a natural number greater than 1.

The second monitoring module may assign one of first to M-th memory blocks BLK21 to BLK2M of the second block pool as the memory block of the second type. For example, the second monitoring module may assign the first memory block BLK21 as the memory block of the second type.

The N-th monitoring module may assign one of first to M-th memory blocks BLKN1 to BLKNM of the N-th block pool as an N-th type of memory block. For example, the N-th monitoring module may assign the first memory block BLKN1 as the N-th type of memory block.

However, the first block pool is dedicated to the first type and the second block pool is dedicated to the second type. Therefore, since an erase count of the first memory block BLK21 of the second block pool is less than that of the second memory block BLK12 of the first block pool, even though the first memory block BLK21 of the second block pool is suitable for assignment as the memory block of the first type, the first memory block BLK21 of the second block pool may not be assigned as the memory block of the first type, and the second memory block BLK12 of the first block pool is required to be assigned as the memory block of the first type.

In a case of a wear-leveling operation, wear-leveling may be performed in the first block pool, wear-leveling may be performed in the second block pool, and wear-leveling may be performed in the N-th block pool. Since the wear-leveling is performed in each of the first to N-th block pools, efficiency of the wear-leveling may be lower than that of a case where the wear-leveling is performed between the first to N-th block pools.

Accordingly, program/erase (P/E) cycles between the first to N-th block pools may not be balanced. For example, during a life cycle of the storage device, while memory blocks of the first block pool consume 30,000 P/E cycles, memory blocks of the second block pool may consume 1,000 P/E cycles, and memory blocks of the third block pool may use all 100,000 P/E cycles, which is a maximum usage of the storage device. A method of efficiently using the storage device by balancing the P/E cycles between the first to N-th block pools is required.

In addition, as each of the first to N-th block pools assigns a free block, the number of memory blocks required for assignment may be greater than the number of memory blocks actually used in the storage device. For example, the first block pool may include the M-th block BLK1M assigned as the free block, and the second block pool may include the M-th block BLK2M assigned as the free block. A method of reducing the number of memory blocks required for assignment is required.

Figure 5:
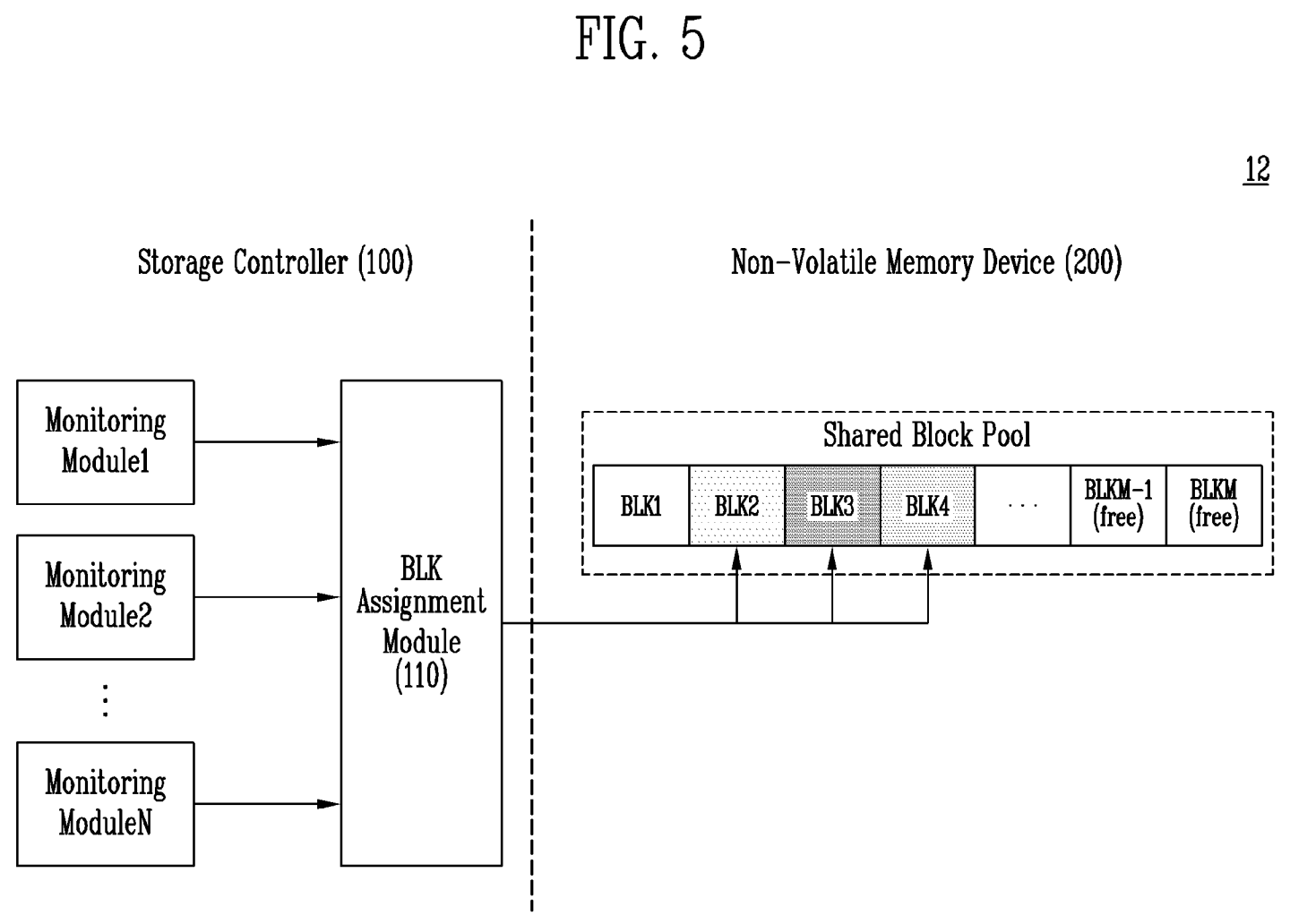

FIG. 5 is a diagram illustrating a method of assigning system memory blocks according to an embodiment of the present disclosure.

Referring to FIG. 5, an operation in which the block assignment module 110 assigns memory blocks of plural types to a shared block pool is described. In some embodiments, the shared block pool may be the first memory block area of the non-volatile memory device 200. In some embodiments, the shared block pool may be a portion of the first memory block area of the non-volatile memory device 200. The shared block pool may include SLC memory blocks. The shared block pool may include the system memory blocks.

Each of the first to N-th monitoring modules may monitor memory blocks previously assigned as memory blocks of the first to N-th types. In some embodiments, when a parameter of the memory block previously assigned, to the shared block pool, as the memory block of the first type reaches a first reference value, the first monitoring module may output a first assignment request to the block assignment module 110. The parameter may be one of a rate at which data is recorded to the previously assigned memory block and a P/E count of the previously assigned memory block. The first reference value may be a reference for determining whether to stop using the memory block previously assigned as the memory block of the first type. For example, when the first reference value is '0.8' and the rate at which data is recorded to the memory block previously assigned as the memory block of the first type is '0.8', the first monitoring module may output the first assignment request.

However, the parameter is not limited to the rate at which data is recorded and the P/E count, and according to a user's setting of the storage device 12, the parameter may be set to a value for stopping the use of the previously assigned memory block and for requesting assignment of a new memory block.

When a parameter of the memory block previously assigned, to the shared block pool, as the memory block of the second type reaches a second reference value, the second monitoring module may output a second assignment request. The second reference value may be a reference for determining whether to stop using the memory block previously assigned as the memory block of the second type. For example, when the second reference value is '0.7' and the rate at which data is recorded to the memory block previously assigned as the memory block of the second type is '0.7', the second monitoring module may output the second assignment request. In some embodiments, the second reference value may be the same as the first reference value.

The block assignment module 110 may assign, to the shared block pool, a target memory block as a memory block of a type, which corresponds to a received assignment request among first to N-th assignment requests, to the shared block pool. In some embodiments, the block assignment module 110 may assign the second memory block BLK2 as the memory block of the first type based on the first assignment request. The block assignment module 110 may assign the third memory block BLK3 as the memory block of the second type based on the second assignment request. The block assignment module 110 may assign the fourth memory block BLK4 as the N-th type of memory block based on the N-th assignment request. Determining the target memory block for the shared block pool among the plurality of memory blocks is described later with reference to FIG. 6.

In FIG. 4, the first to N-th monitoring modules exclusively assign memory blocks of the first to N-th types to the first to N-th block pools, respectively. In contrast, the block assignment module 110 of FIG. 5 may collectively assign memory blocks of the first to N-th types to the shared block pool. The system memory blocks may be efficiently used by assigning memory blocks of the first to N-th types in consideration of a minimum erase count and a maximum erase count in the entire shared block pool and performing wear-leveling on the entire shared block pool. Differently from each of the first to N-th block pools of FIG. 4 assigning the free block, the block assignment module 110 of FIG. 5 may share the free block in the shared block pool by assigning, as the free blocks, the (M−1)-th memory block BLKM−1 and the M-th memory block BLKM, thereby reducing the number of required memory blocks. That is, performance of the storage device may be improved.

In addition, the memory block of the first type of FIG. 4 may have a physical address of the first block pool, and the memory block of the second type may have a physical address of the second block pool. However, in a case of FIG. 5, the memory block of the first type and the memory block of the second type may have a physical address of the shared block pool. That is, differently from FIG. 4, the memory block of the first type may have a physical address of the second memory block BLK2, and the memory block of the second type may have a physical address of the third memory block BLK3 having a physical address adjacent to the first memory block BLK1.

Figure 6:
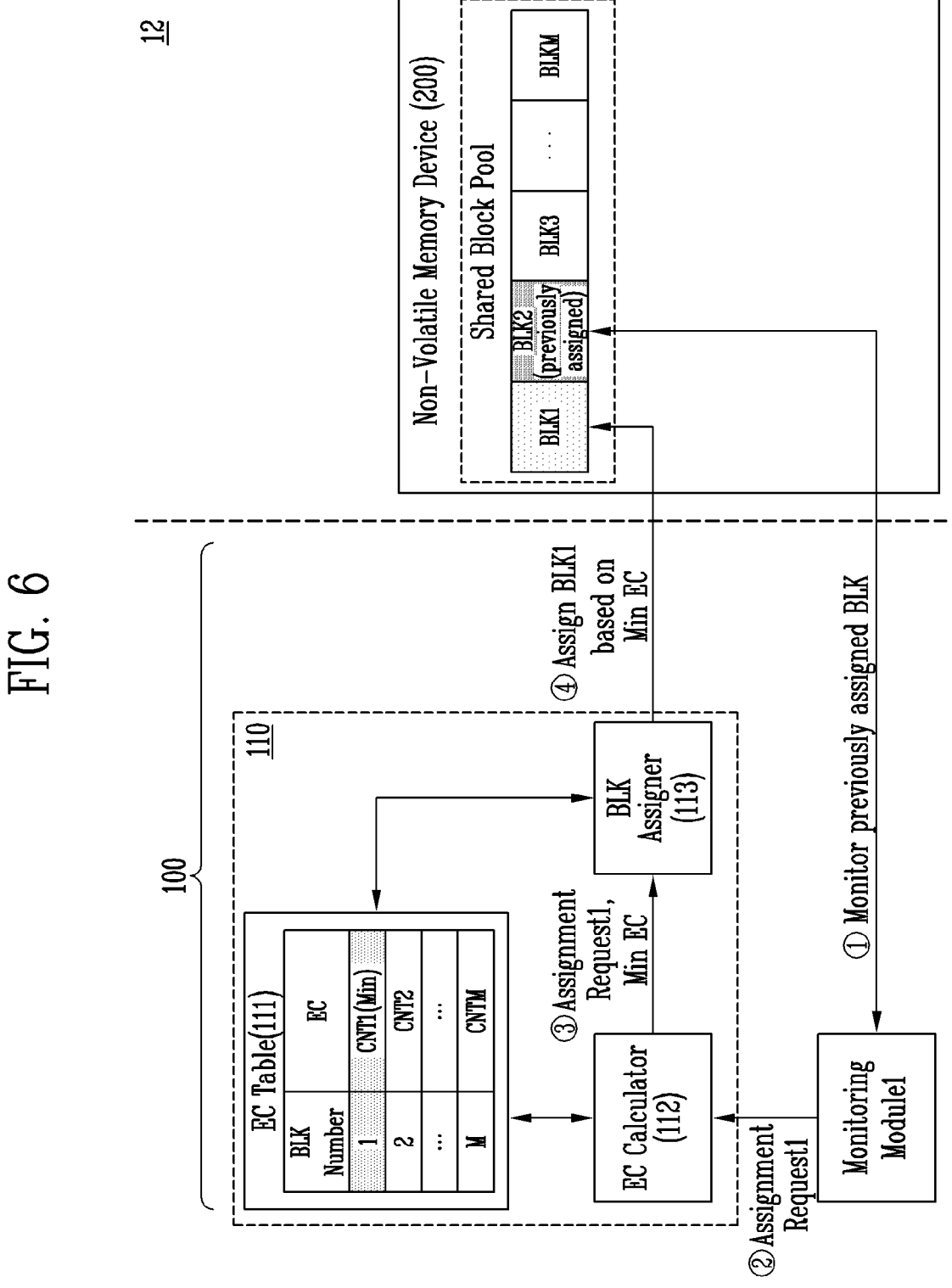
FIG. 6 is a diagram illustrating an operation method of a storage device according to an embodiment of the present disclosure.

FIG. 6 is a diagram illustrating an operation method of a storage device according to an embodiment of the present disclosure.

Referring to FIG. 6, a block assignment operation of assigning the memory block of the first type to the shared block pool of the storage device 12 is shown. The storage controller 100 may include the first monitoring module and the block assignment module 110. The block assignment module 110 may include the EC table 111, the EC calculator 112, and the block assigner 113. The EC table 111, the EC calculator 112, and the block assigner 113 may respectively correspond to the EC table 111, the EC calculator 112, and the block assigner 113 of FIG. 2.

Referring to the EC table 111 shown in FIG. 6, first to M-th erase counts CNT1 to CNTM of the respective first to M-th memory blocks BLK1 to BLKM are shown. The first to M-th memory blocks BLK1 to BLKM and the first to M-th erase counts CNT1 to CNTM may correspond to each other. For example, the first erase count CNT1 may be an erase count of the first memory block BLK1. The second erase count CNT2 may be an erase count of the second memory block BLK2. Among the first to M-th erase counts, the minimum erase count may be the first erase count CNT1.

Referring to the non-volatile memory device 120 shown in FIG. 6, the shared block pool is shown. The shared block pool may include the first to M-th memory blocks BLK1 to BLKM. Each of the first to M-th memory blocks BLK1 to BLKM may be a memory block in the first memory block area. In some embodiments, each of the first to M-th memory blocks BLK1 to BLKM may be an SLC memory block.

Hereinafter, an operation method of the storage device 12 assigning, to the shared block pool, the memory block as the memory block of the first type is described, according to some embodiments of the present disclosure. A memory block assigned as the memory block of the first type may be a mapping block. For convenience of description and brevity of the drawings, unnecessary components are omitted.

In a first operation (①), the first monitoring module may monitor the second memory block BLK2 previously assigned, to the shared block pool, as the memory block of the first type. In some embodiments, the first monitoring module may periodically compare a parameter of the second memory block BLK2 with the first reference value. The first monitoring module may compare the parameter of the second memory block BLK2 with the first reference value for each predetermined period. The predetermined period may be determined by a user of the storage device 12. In some embodiments, the first monitoring module may compare the parameter of the second memory block BLK2 with the first reference value whenever the write operation or the erase operation of the storage device 12 is performed.

In a second operation (②), when the parameter of the second memory block BLK2 exceeds the first reference value, the first monitoring module may output the first assignment request.

In a third operation (③), in response to the first assignment request, the EC calculator 112 may output the minimum erase count and the first assignment request. For example, in response to the first assignment request, the EC calculator 112 may output the first erase count CNT1 which is the minimum erase count and the first assignment request.

In a fourth operation (④), the block assigner 113 may assign, to the shared block pool, the first memory block BLK1 corresponding to the first erase count CNT1 as the memory block of the first type, based on the first erase count CNT1 and the first assignment request.

In the present disclosure, the EC calculator 112 outputs the first assignment request to the block assigner 113, but the present disclosure is not limited thereto, and the first monitoring module may output the first assignment request to the EC calculator 112 and the block assigner 113.

In addition, similar to the operation in which the block assignment module 110 assigns, to the shared block pool, the memory block as the memory block of the first type in FIG. 6, the block assignment module 110 may assign, to the shared block pool, the memory block as the memory block of the third type. The memory block assigned as the memory block of the third type may be a static SLC block.

In some embodiments, a third monitoring module (not shown) may monitor a memory block previously assigned, to the shared block pool, as the memory block of the third type. The third monitoring module may output a third assignment request when a parameter of the memory block previously assigned as the memory block of the third type exceeds a third reference value. In response to the third assignment request, the EC calculator 112 may output the minimum erase count among the first to M-th erase counts of the EC table 111 and the third assignment request. Based on the third assignment request and the first erase count CNT1, the block assigner 113 may assign the first memory block BLK1 corresponding to the first erase count CNT1 as the memory block of the third type.

Figure 7:
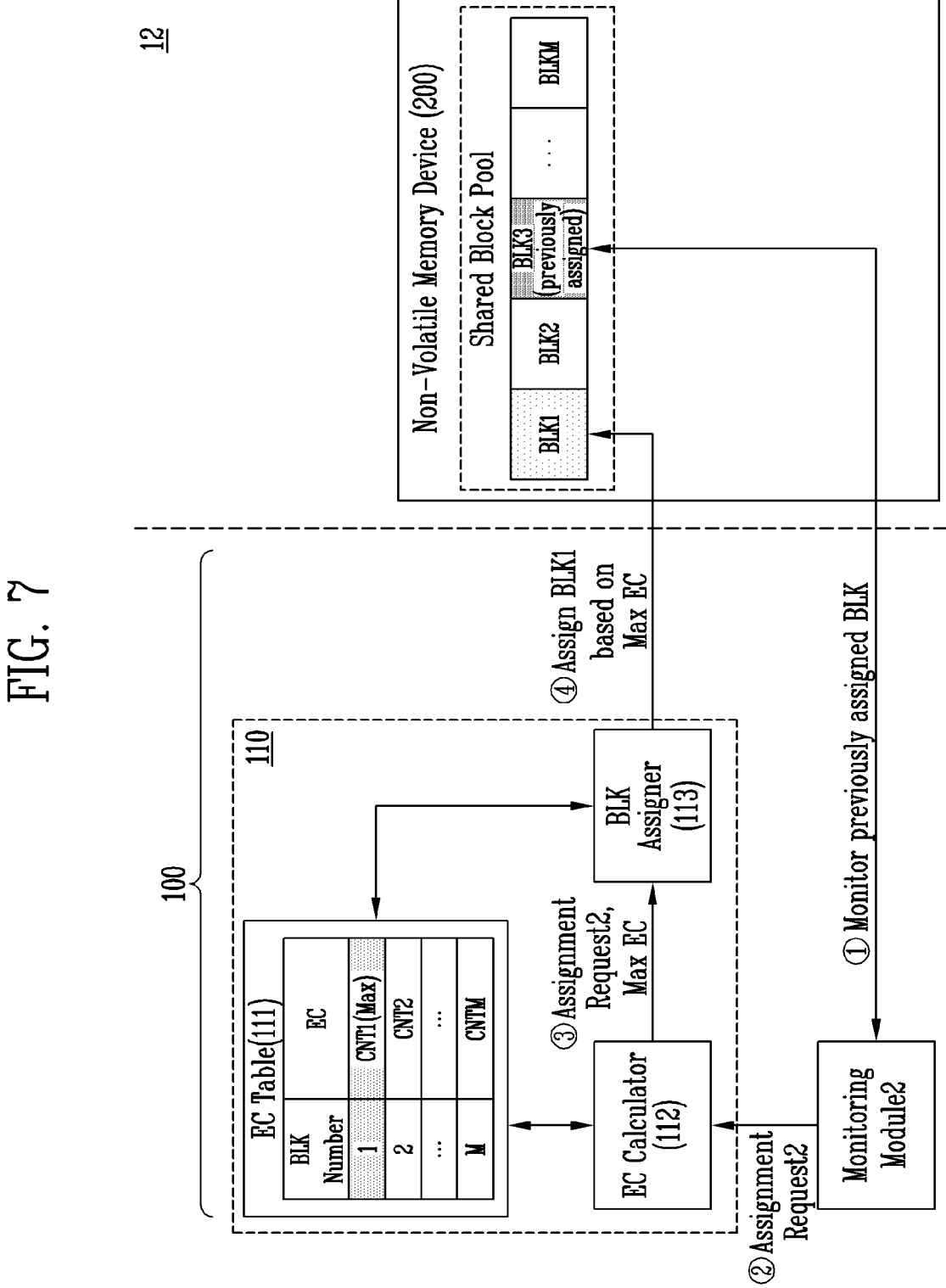
FIG. 7 is a diagram illustrating an operation method of a storage device according to an embodiment of the present disclosure.

FIG. 7 is a diagram illustrating an operation method of a storage device according to an embodiment of the present disclosure.

Referring to FIG. 7, a block assignment operation of assigning the memory block of the second type to the shared block pool of the storage device 12 is shown. The storage controller 100 may include the second monitoring module and the block assignment module 110. The block assignment module 110 may include the EC table 111, the EC calculator 112, and the block assigner 113. The EC table 111, the EC calculator 112, and the block assigner 113 may respectively correspond to the EC table 111, the EC calculator 112, and the block assigner 113 of FIG. 2.

Referring to the EC table 111 shown in FIG. 7, first to M-th erase counts CNT1 to CNTM of the respective first to M-th memory blocks BLK1 to BLKM are shown. Among the first to M-th erase counts, the maximum erase count may be the first erase count CNT1.

Referring to the non-volatile memory device 120 shown in FIG. 7, the shared block pool is shown. The shared block pool may include the first to M-th memory blocks BLK1 to BLKM. Each of the first to M-th memory blocks BLK1 to BLKM may be a memory block in the first memory block area. In some embodiments, each of the first to M-th memory blocks BLK1 to BLKM may be an SLC memory block.

Hereinafter, an operation method of the storage device 12 assigning, to the shared block pool, the memory block as the memory block of the second type is described, according to some embodiments of the present disclosure. A memory block assigned as the memory block of the second type may be the PLP block. For convenience of description and brevity of the drawings, unnecessary components are omitted.

In a first operation (①), the second monitoring module may monitor the third memory block BLK3 previously assigned, to the shared block pool, as the memory block of the second type. In some embodiments, the second monitoring module may periodically compare a parameter of the third memory block BLK3 with the second reference value. In some embodiments, the second monitoring module may compare the parameter of the third memory block BLK3 with the second reference value whenever the write operation or the erase operation of the storage device 12 is performed.

In a second operation (②), when the parameter of the third memory block BLK3 exceeds the second reference value, the second monitoring module may output the second assignment request.

In a third operation (③), in response to the second assignment request, the EC calculator 112 may output the maximum erase count and the second assignment request. For example, in response to the second assignment request, the EC calculator 112 may output the first erase count CNT1 which is the maximum erase count and the second assignment request.

In a fourth operation (④), the block assigner 113 may assign, to the shared block pool, the first memory block BLK1 corresponding to the first erase count CNT1 as the memory block of the second type, based on the second assignment request and the first erase count CNT1.

In the present disclosure, the EC calculator 112 outputs the second assignment request to the block assigner 113, but the present disclosure is not limited thereto, and the second monitoring module may output the second assignment request to the EC calculator 112 and the block assigner 113.

Figure 8:
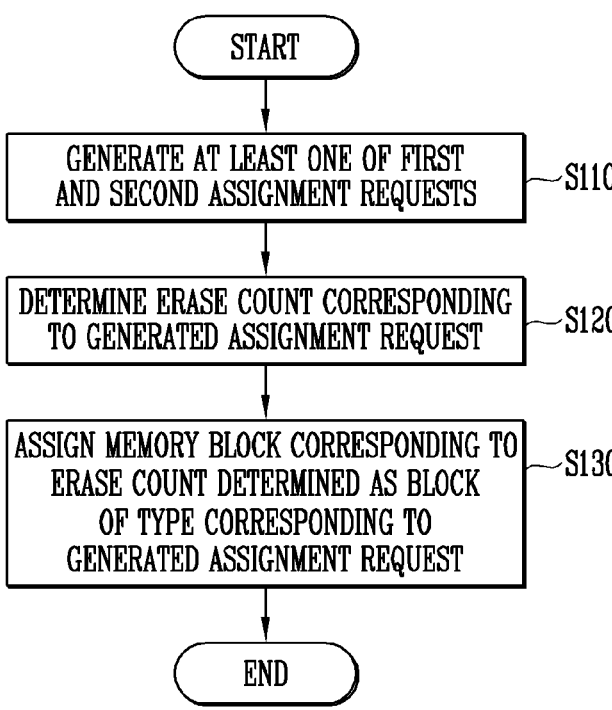
FIG. 8 is a flowchart illustrating an operation method of a storage controller according to an embodiment of the present disclosure.

FIG. 8 is a flowchart illustrating an operation method of a storage controller according to an embodiment of the present disclosure.

Referring to FIG. 8, an operation in which the storage controller 100 assigns memory blocks of plural types to the shared block pool of the non-volatile memory device is described. The storage controller 100 may correspond to the storage controller 100 of FIGS. 6 and 7.

In operation S110, the storage controller 100 may generate at least one assignment request of the first and second assignment requests. In some embodiments, the storage controller 100 may monitor a memory block previously assigned, to the shared block pool, as the memory block of the first type. The storage controller 100 may monitor a memory block previously assigned, to the shared block pool, as the memory block of the second type. The memory block of the first type may be the mapping block. The memory block of the second type may be the PLP block.

The storage controller 100 may generate the first assignment request when the parameter of the memory block previously assigned, to the shared block pool, as the memory block of the first type exceeds the first reference value. The storage controller 100 may generate the second assignment request when the parameter of the memory block previously assigned, to the shared block pool, as the memory block of the second type exceeds the second reference value.

In operation S120, the storage controller 100 may determine a target erase count corresponding to the generated assignment request. In some embodiments, when the first assignment request is generated, the storage controller 100 may determine the minimum erase count as the target erase count. When the second assignment request is generated, the storage controller 100 may determine the maximum erase count as the target erase count.

In operation S130, the storage controller 100 may assign, to the shared block pool, a memory block corresponding to the target erase count as a memory block of a type corresponding to the generated assignment request. In some embodiments, when the first assignment request is generated, a memory block corresponding to the minimum erase count may be assigned as the memory block of the first type. When the second assignment request is generated, a memory block corresponding to the maximum erase count may be assigned as the memory block of the second type.

Figure 9:
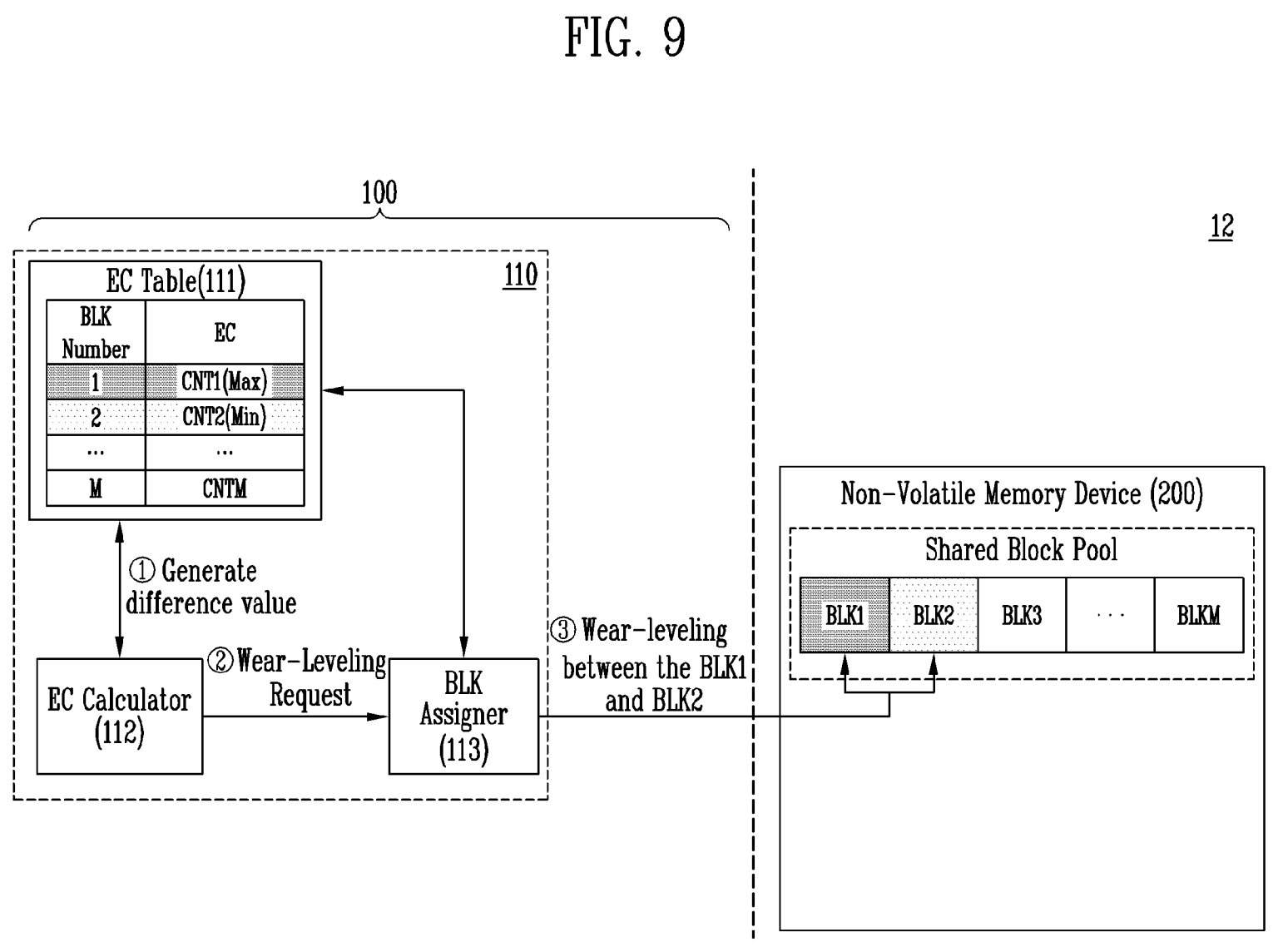

FIG. 9 is a diagram illustrating an operation method of a storage device according to an embodiment of the present disclosure.

Referring to FIG. 9, the wear-leveling operation of the storage device 12 is shown. The storage controller 100 may include the block assignment module 110. The block assignment module 110 may include the EC table 111, the EC calculator 112, and the block assigner 113. The EC table 111, the EC calculator 112, and the block assigner 113 may respectively correspond to the EC table 111, the EC calculator 112, and the block assigner 113 of FIG. 2.

Referring to the non-volatile memory device 120 shown in FIG. 9, the shared block pool is shown. The shared block pool may include the first to M-th memory blocks BLK1 to BLKM. Each of the first to M-th memory blocks BLK1 to BLKM may be the memory block in the first memory block area. In some embodiments, each of the first to M-th memory blocks BLK1 to BLKM may be an SLC memory block.

Referring to the EC table 111 shown in FIG. 9, the first to M-th erase counts CNT1 to CNTM of the respective first to M-th memory blocks BLK1 to BLKM are shown. The first to M-th memory blocks BLK1 to BLKM and the first to M-th erase counts CNT1 to CNTM may correspond to each other. Among the first to M-th erase counts, the maximum erase count may be the first erase count CNT1, and the minimum erase count may be the second erase count CNT2.

Hereinafter, an operation method of the storage device 12 that performs wear-leveling between the first to M-th memory blocks BLK1 to BLKM in the shared block pool according to some embodiments of the present disclosure is described. For convenience of description and brevity of the drawings, unnecessary components are omitted.

In a first operation (①), the EC calculator 112 may generate a difference value by calculating a difference between the maximum erase count and the minimum erase count among the first to M-th erase counts of the EC table 111. For example, the EC calculator 112 may generate the difference value by calculating a difference between the first erase count CNT1 and the second erase count CNT2.

In some embodiments, the EC calculator 112 may calculate the difference value by periodically calculating the difference between the minimum erase count and the maximum erase count. In some embodiments, the EC calculator 112 may generate the difference value by calculating the difference between the minimum erase count and the maximum erase count each time at least one of the first to M-th erase counts of the EC table 111 is updated.

In a second operation (②), when the difference value exceeds a wear-leveling reference value, the EC calculator 112 may output a wear-leveling request. The wear-leveling request may indicate to perform wear-leveling between the first to M-th memory blocks BLK1 to BLKM in the shared block pool. When the difference of the erase counts between the first to M-th memory blocks BLK1 to BLKM in the shared block pool widens to a predetermined value or more, the EC calculator 112 may output a wear-leveling request so that the P/E cycles between the first to M-th memory blocks BLK1 to BLKM become equal.

In a third operation (③), the block assigner 113 may perform wear-leveling on the first memory block BLK1 corresponding to the maximum erase count CNT1 and the second memory block BLK2 corresponding to the minimum erase count CNT2 in response to the wear-leveling request. In some embodiments, the block assigner 113 may store data, which is stored in the first memory block BLK1, in the second memory block BLK2, and store data, which is stored in the second memory block BLK2, in the first memory block BLK1, in response to the wear-leveling request.

The wear-leveling operation described with reference to FIG. 9 may be performed after the block assignment operation described with reference to FIGS. 6 and 7. For example, the storage device 12 may perform the wear-leveling operation on memory blocks which are not assigned according to the assignment request received in FIGS. 6 and 7 among the first to M-th memory blocks BLK1 to BLKM.

In some embodiments, the EC calculator 112 may select the minimum erase count among a plurality of erase counts corresponding to the memory blocks which are not assigned by the assignment request received in FIGS. 6 and 7 as a first wear-leveling count. The first wear-leveling count may have the smallest value among the plurality of erase counts corresponding to the memory blocks which are not assigned by the assignment request received in FIGS. 6 and 7.

The EC calculator 112 may select a count having the largest value among the plurality of erase counts corresponding to the memory blocks which are not assigned by the assignment request received in FIGS. 6 and 7 as a second wear-leveling count. The second wear-leveling count may have the largest value among the plurality of erase counts corresponding to the memory blocks which are not assigned by the assignment request received in FIGS. 6 and 7.

The EC calculator 112 may calculate a difference value between the first wear-leveling count and the second wear-leveling count, and when the difference value is greater than a reference value, the EC calculator 112 may output the wear-leveling request to the block assigner 113.

Figure 10:
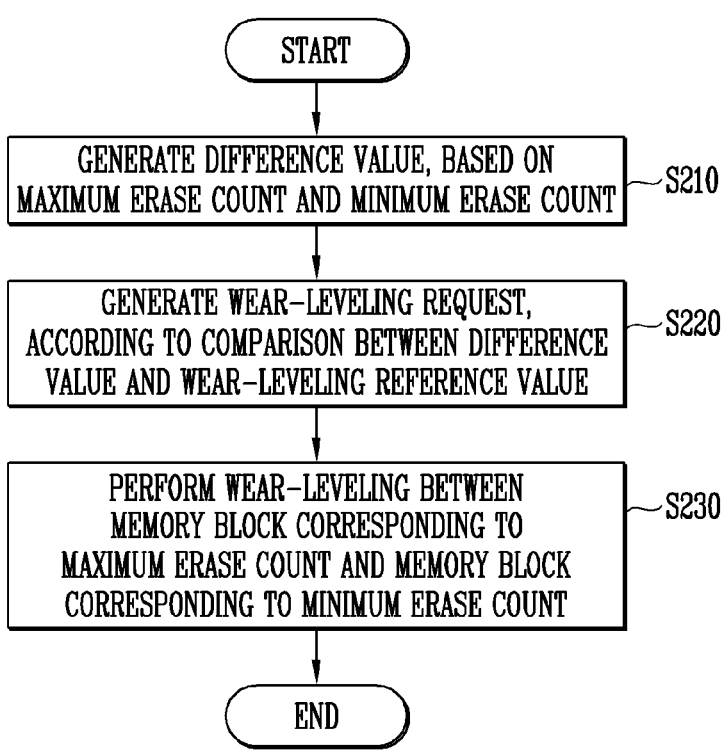
FIG. 10 is a flowchart illustrating an operation method of a storage controller according to an embodiment of the present disclosure.

FIG. 10 is a flowchart illustrating an operation method of a storage controller according to an embodiment of the present disclosure.

Referring to FIG. 10, an operation in which the storage controller 100 performs wear-leveling between the plurality of memory blocks in the shared block pool of the non-volatile memory device is described. The storage controller 100 may correspond to the storage controller 100 of FIG. 9.

In operation S210, the storage controller 100 may generate the difference value by calculating the difference between the maximum erase count and the minimum erase count among the first to M-th erase counts of the non-volatile memory device. In some embodiments, the storage controller 100 may generate the difference value by periodically calculating the difference between the minimum erase count and the maximum erase count. The storage controller 100 may generate the difference value by calculating the difference between the minimum erase count and the maximum erase count whenever the first to M-th erase counts are updated.

In operation S220, the storage controller 100 may generate the wear-leveling request when the difference value exceeds the wear-leveling reference value.

In operation S230, based on the generation of the wear-leveling request, the storage controller 100 may perform the wear-leveling on the memory block corresponding to the maximum erase count and the memory block corresponding to the minimum erase count. In some embodiments, in response to the wear-leveling request, the storage controller 100 may store data, which is stored in the memory block corresponding to the maximum erase count, in the memory block corresponding to the minimum erase count, and store data, which is stored in the memory block corresponding to the minimum erase count, in the memory block corresponding to the maximum erase count.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims. Furthermore, the embodiments may be combined to form additional embodiments.

What is claimed is:

1. A storage device comprising:
   a non-volatile memory device including a first memory block area and a second memory block area; and
   a storage controller configured to:
      control the non-volatile memory device,
      determine a target erase count based on a generated assignment request among a first assignment request and a second assignment request,
      select, among a plurality of memory blocks included in the first memory block area, a target memory block corresponding to the target erase count, and assign the target memory block to a shared block pool as a memory block of a type corresponding to the generated assignment request, wherein the first assignment request corresponds to a memory block of a first type, wherein the first type is defined by storing mapping data in the first memory block area, wherein the second assignment request corresponds to a memory block of a second type, wherein the second type is defined by storing power loss protection (PLP) data in the first memory block area, wherein the shared block pool comprises the memory blocks of both the first type and the second type, and wherein the target memory block is included in the first memory block area.

2. The storage device of claim 1, wherein the storage controller comprises:

an erase count table configured to store a plurality of erase counts respectively corresponding to the plurality of memory blocks in the first memory block area;

an erase count calculator configured to output the target erase count among the plurality of erase counts based on the generated assignment request; and a block assigner configured to:

assign the target memory block, as the memory block of the type corresponding to the generated assignment request, to the shared block pool.

3. The storage device of claim 2, wherein the erase count calculator outputs, as the target erase count, a minimum erase count among the plurality of erase counts when the generated assignment request is the first assignment request and a maximum erase count among the plurality of erase counts when the generated assignment request is the second assignment request.

4. The storage device of claim 3, wherein the block assigner selects, as the target memory block, a first memory block corresponding to the minimum erase count among the plurality of memory blocks in the first memory block area when the generated assignment request is the first assignment request and a second memory block corresponding to the maximum erase count among the plurality of memory blocks in the first memory block area when the generated assignment request is the second assignment request.

5. The storage device of claim 1, wherein a memory element included in the first memory block area has a lower capacity of storing therein a number of data bits than a memory element included in the second memory block area.

6. The storage device of claim 5, wherein the memory element included in-in the first memory block area is a single level cell (SLC) memory element.

7. The storage device of claim 1, wherein the storage controller controls the non-volatile memory device so that a memory element included in the first memory block area has a lower capacity of storing therein a number of data bits than a memory element included in the second memory block area.

8. The storage device of claim 7, wherein the number of data bits to be stored in the memory elements in each of the first and second memory block areas is plural.

9. The storage device of claim 8, wherein the number of data bits to be stored in the memory elements in the second memory block area is three (3) or greater.

10. The storage device of claim 1, wherein the storage controller controls the non-volatile memory device to store the mapping data in the memory block of the first type and store the PLP data in the memory block of the second type.

11. The storage device of claim 2, wherein the erase count calculator is further configured to:

select, as a first wear-leveling count, a minimum erase count among a plurality of erase counts corresponding to memory blocks which are not assigned according to the generated assignment request among the plurality of memory blocks, select, as a second wear-leveling count, a maximum erase count among the plurality of erase counts corresponding to the memory blocks which are not assigned according to the generated assignment request among the plurality of memory blocks, calculate a difference value between the first wear-leveling count and the second wear-leveling count, and output a wear-leveling request to the block assigner when the difference value is greater than a reference value.

12. The storage device of claim 11, wherein the block assigner is further configured to perform, based on the wear-leveling request, a wear-leveling operation on the memory blocks which are not assigned according to the generated assignment request among the plurality of memory blocks.

13. The storage device of claim 12, wherein the block assigner performs the wear-leveling operation by:

moving data from a memory block corresponding to the first wear-leveling count to a memory block corresponding to the second wear-leveling count, and moving data from the memory block corresponding to the second wear-leveling count to the memory block corresponding to the first wear-leveling count.

14. The storage device of claim 1, wherein the storage controller is further configured to manage, as a parameter, at least one of a rate at which data is written to each of the plurality of memory blocks located in the first memory block area, and a program/erase count of each of the plurality of memory blocks located in the first memory block area.

15. The storage device of claim 14, wherein the storage controller is further configured to output:

the first assignment request when the parameter corresponding to a third memory block previously assigned to the shared block pool, as the memory block of the first type among the plurality of memory blocks, is equal to or greater than a first reference value, and the second assignment request when the parameter corresponding to a fourth memory block previously assigned to the shared block pool, as the memory block of the second type among the plurality of memory blocks, is equal to or greater than a second reference value.

16. An operating method of a storage controller communicating with a non-volatile memory device including a first memory block area and a second memory block area, the operating method comprising:

generating at least one of a first assignment request and a second assignment request;

determining a target erase count based on a generated assignment request;

selecting, among a plurality of memory blocks included in the first memory block area, a target memory block corresponding to the target erase count, and assigning the target memory block, to a shared block pool as a memory block corresponding to the generated assignment request, wherein the first assignment request corresponds to a memory block of a first type, wherein the first type is defined by storing mapping data in the first memory block area, wherein the second assignment request corresponds to a memory block of a second type, wherein the second type is defined by storing power loss protection (PLP) in the first memory block area, wherein the shared block pool comprises the memory blocks of both the first type and the second type, and wherein the target memory block is included in the first memory block area.

17. The operating method of claim 16, wherein the determining the target erase count based on the generated assignment request comprises determining, as the target erase count, a minimum erase count among a plurality of erase counts respectively corresponding to the plurality of memory blocks in the first memory block area when the generated assignment request is the first assignment request.

18. The operating method of claim 16, wherein the determining the target erase count based on the generated assignment request comprises determining, as the target erase count, a maximum erase count among a plurality of erase counts respectively corresponding to a plurality of memory blocks in the first memory block area when the generated assignment request is the second assignment request.

19. The operating method of claim 16, wherein a memory element included in the first memory block area has a lower capacity of storing therein a number of data bits than a memory element included in the second memory block area.

20. The operating method of claim 16, wherein the memory block of the first type stores the mapping data of the non-volatile memory device, and the memory block of the second type stores the PLP data.

* * * * *